(12) United States Patent
Raghu et al.

(10) Patent No.: US 9,337,953 B1
(45) Date of Patent: May 10, 2016

(54) SMART DEVICE FOR CONTROLLING AVIONICS DATA TRANSFER APPARATUS AND METHOD

(71) Applicant: Rockwell Collins, Inc., Cedar Rapids, IA (US)

(72) Inventors: Kaushik Raghu, Cedar Rapids, IA (US); Christopher Lewis, North Liberty, IA (US); Ivan Hall, Iowa City, IA (US); Richard Moore, Cedar Rapids, IA (US); Patrick Cosgrove, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 512 days.

(21) Appl. No.: 13/625,330

(22) Filed: Sep. 24, 2012

(51) Int. Cl.
*G06F 15/167* (2006.01)
*H04L 1/00* (2006.01)
*H04L 5/16* (2006.01)
*H04L 12/28* (2006.01)

(52) U.S. Cl.
CPC ................ *H04L 1/0025* (2013.01); *H04L 5/16* (2013.01); *H04L 12/2834* (2013.01)

(58) Field of Classification Search
CPC ... H04L 12/2834; H04L 63/061; H04L 41/22; H04L 12/283; H04L 29/06823; H04L 65/4092
USPC ......................................................... 709/213
See application file for complete search history.

(56) References Cited

U.S. PATENT DOCUMENTS

| | | | |
|---|---|---|---|
| 5,167,020 A | 11/1992 | Kahn et al. | |
| 8,489,846 B1 * | 7/2013 | Jensen | G06F 21/74 |
| | | | 711/173 |
| 8,856,508 B2 * | 10/2014 | Genissel | H04L 63/105 |
| | | | 713/150 |
| 2007/0027589 A1 | 2/2007 | Brinkley et al. | |
| 2007/0127460 A1 * | 6/2007 | Wilber et al. | 370/389 |
| 2007/0183435 A1 | 8/2007 | Kettering et al. | |
| 2007/0243505 A1 * | 10/2007 | Rath | G09B 9/48 |
| | | | 434/29 |
| 2007/0246610 A1 | 10/2007 | Rath et al. | |
| 2010/0199083 A1 * | 8/2010 | Genissel | 713/150 |

* cited by examiner

*Primary Examiner* — Kevin Bates
*Assistant Examiner* — Sm Rahman
(74) *Attorney, Agent, or Firm* — Angel N. Gerdzhikov; Donna P. Suchy; Daniel M. Barbieri

(57) ABSTRACT

A method and apparatus for controlling data transfer between a data providing device and an aircraft equipment. The method includes operating in a device mode, wherein the device mode allows the transfer of data between the data providing device and a storage medium of an intermediate device and disallows the transfer of data between the aircraft equipment and the storage medium. The method also includes operating in an avionics mode, wherein the avionics mode allows the transfer of data between the aircraft equipment and the storage medium and disallows the transfer of data between the data providing device and the storage medium. Furthermore, the method includes no more than one of operating in the device mode or operating in the avionics mode occurring at any particular time.

21 Claims, 5 Drawing Sheets

500

510 Switching to a device mode, wherein the device mode allows the transfer of data between the data providing device and the storage medium and disallows the transfer of data between the avionics device and the storage medium 520 Switching to an avionics mode, wherein the avionics mode allows the transfer of data between the avionics device and the storage medium and disallows the transfer of data between the data providing device and the storage medium

FIG. 5

SMART DEVICE FOR CONTROLLING AVIONICS DATA TRANSFER APPARATUS AND METHOD

FIELD OF THE INVENTION

The present invention is directed generally toward data transfer between a data providing device and aircraft equipment via an intermediate device having a switch mechanism and storage.

BACKGROUND OF THE INVENTION

Currently, when operators of aircraft update databases and transfer information into the aircraft, the operators must first access the database or information from a fixed device (such as a desktop personal computer (PC)) which may be connected to the internet. Then, the operator must copy the database or information to a portable storage device (such as a USB (universal serial bus) flash drive) and walk the portable storage device to the aircraft to load the databases or information into the aircraft. This current process of loading information into an aircraft can take a long time to perform which results in added aircraft downtime and increased operational cost.

While many avionics devices (such as aircraft computing devices or aircraft equipment) are configured to allow a USB storage drive to be connected to the avionics devices so that the avionics devices can read or load databases from the USB storage drive, most avionics devices are not permitted by the FAA (Federal Aviation Administration) to transfer data to or from more complex uncertified computing devices, such as laptop computers or mobile computing devices. The FAA has expressed a strong concern about mobile computing devices (such as smart phones, tablet computing devices, laptop computers, or the like) directly interacting with aircraft equipment. Furthermore, the FAA generally only permits certain approved devices to transfer data to and from avionics devices, and typically, the FAA classifies mobile computing devices as uncertified devices. Because the FAA does not allow an uncertified computing device to be directly connected to aircraft flight deck equipment or connected via a wireless connection, there is a strong need in the aviation industry for a mechanism which would facilitate secure data transfer from a mobile computing device to an avionics device.

Consequently, it would be advantageous if a method and apparatus existed which would allow operators in the aviation industry to utilize mobile devices, regardless of whether the mobile devices are certified or uncertified; thus, it would be advantageous to effectively exchange data securely between the mobile devices and avionics devices without directly communicating with the avionics device. Additionally, it would be advantageous if a method and apparatus existed which would be suitable for improving the efficiency of data transfer between aircraft and computing devices, for reducing constraints on operators to perform database updates, and for simplifying the database update and data transfer process.

SUMMARY OF THE INVENTION

Accordingly, the present disclosure is directed to a novel method and apparatus for controlling data transfer between a data providing device and an avionics device.

Embodiments include a method and apparatus for controlling data transfer between a data providing device and an avionics device. Embodiments may also include a non-transitory computer-readable medium having computer-executable instructions for performing the method for controlling data transfer between a data providing device and an avionics device. The method includes operating in a device mode, wherein the device mode allows the transfer of data between the data providing device and a storage medium of an intermediate device and disallows the transfer of data between the avionics device and the storage medium. The method also includes operating in an avionics mode, wherein the avionics mode allows the transfer of data between the avionics device and the storage medium and disallows the transfer of data between the data providing device and the storage medium. Furthermore, the method includes no more than one of operating in the device mode or operating in the avionics mode occurring at any particular time. Furthermore, the method may be performed by an intermediary device, the data providing device, the avionics device, or the like. Similarly, the intermediary device, the data providing device, the avionics device, or the like may include the non-transitory computer-readable medium having computer-executable instructions for performing the method for controlling data transfer between a data providing device and an avionics device.

Further embodiments include an intermediary device for controlling data transfer between a data providing device and an avionics device. The intermediary device may include a housing, a storage medium, at least one user-interface control, a first data port, a second data port, and a switcher device. The housing may include or enclose the storage medium, the at least one user-interface control, the first data port, the second data port, and the switcher device. The at least one user-interface control may include at least one button. The first data port may be configured to connect to the data providing device. The second data port may be configured to connect to the avionics device. The switcher device is configured to allow the transfer of data between the storage medium and no more than one of the first data port or the second data port at a particular time.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous objects and advantages of the present invention may be better understood by those skilled in the art by reference to the accompanying figures in which:

FIG. 5 shows a method for providing data transfer between a data providing device and an avionics device.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Embodiments of the invention allow a storage medium 120 of an intermediate vault device 100 to receive data from a data providing device 210 and to store the data in the storage medium while operating in the device mode. Upon a switch to the avionics mode, the avionics device 220 is configured to read or load the data from the storage medium 120 while operating in the avionics mode. However, the data providing device is never directly communicatively coupled to the avionics device 220. Therefore, embodiments simplify data transfer from an uncertified device (by the FAA) to an avionics device via the embodiments of the invention. A data providing device may be or may include a mobile computing device (such as smart phone, tablet computing device, or the like), a computing device (such as a laptop computer, a personal computer, a router, or the like), a storage device, or the like. The avionics device 220 can include a computing device of an aircraft, aircraft equipment, avionics, or the like.

Figure 1A:
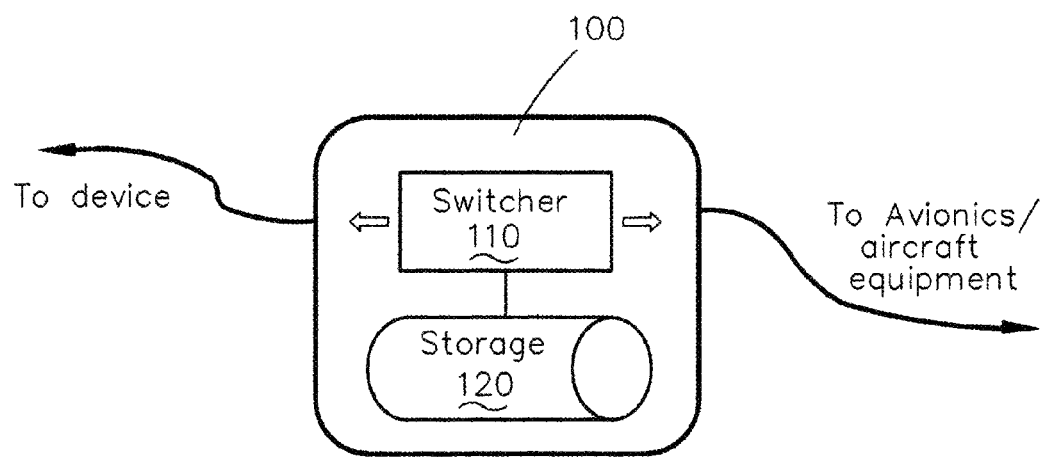
FIG. 1A shows a diagram of an embodiment of the present invention having storage and a switcher mechanism.

Referring to FIG. 1A, a block diagram of an embodiment of the invention including a data-transfer cable and a vault 100 is shown. The data transfer cable is configured to be coupled to a device 210 (as additionally shown in FIG. 2) at one end and coupled to an aircraft, aircraft equipment, or avionics 220 (as additionally shown in FIG. 2) at a second end. The data transfer cable can include the vault 100 or may be removably coupleable to the vault 100. As shown in FIG. 1A, the vault 100 can include a storage device 120, a switcher mechanism 110, and/or the like.

Figure 1B:
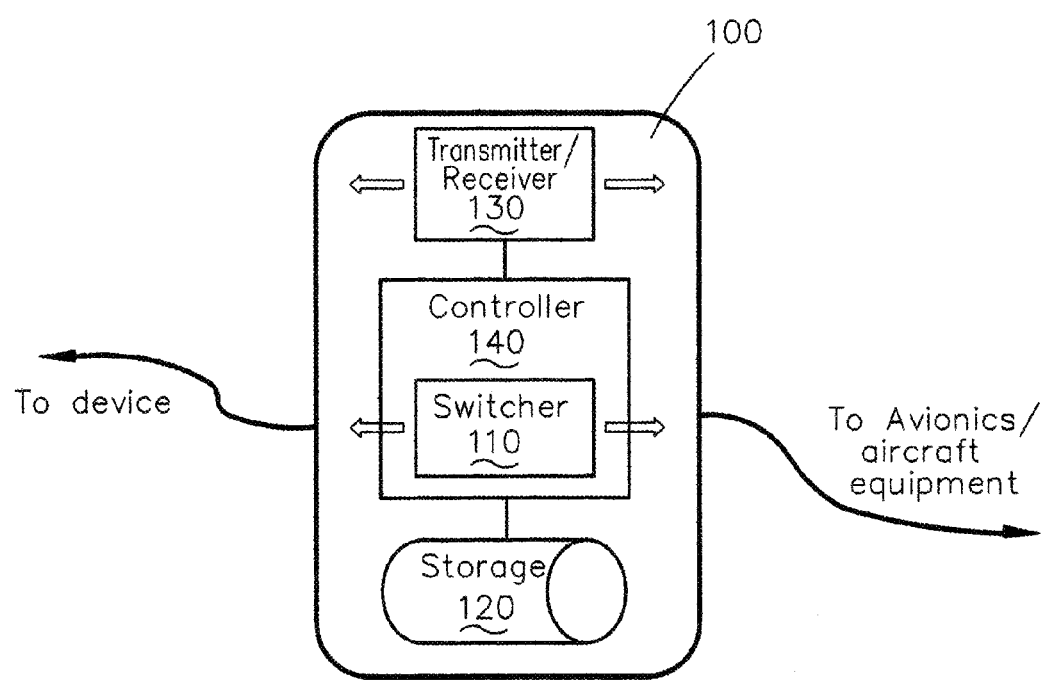
FIG. 1B shows a diagram of a further embodiment having storage, a transmitter/receiver, a controller, and a switcher mechanism.

Referring to FIG. 1B, a block diagram of an additional embodiment of the invention with a vault 100 is shown. The vault 100 is configured to be coupled through a wireless or wired connection to a device 210 and coupled through a wired or wireless connection to an aircraft, aircraft equipment, or avionics 220 (as additionally shown in FIG. 2). The data transfer cable can include the vault 100 or may be removably coupleable to the vault 100. The vault 100 can include a storage device 120, a switcher mechanism 110, a controller 140, a transmitter/receiver 130, and/or the like.

Figure 2A:
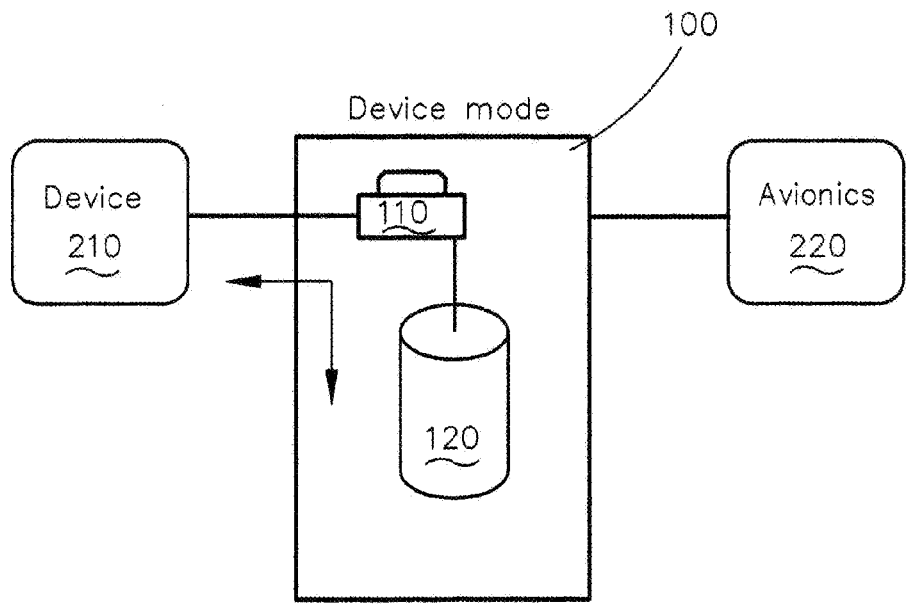
FIG. 2A shows a diagram depicting a device mode of an embodiment of the present invention.
Figure 2B:
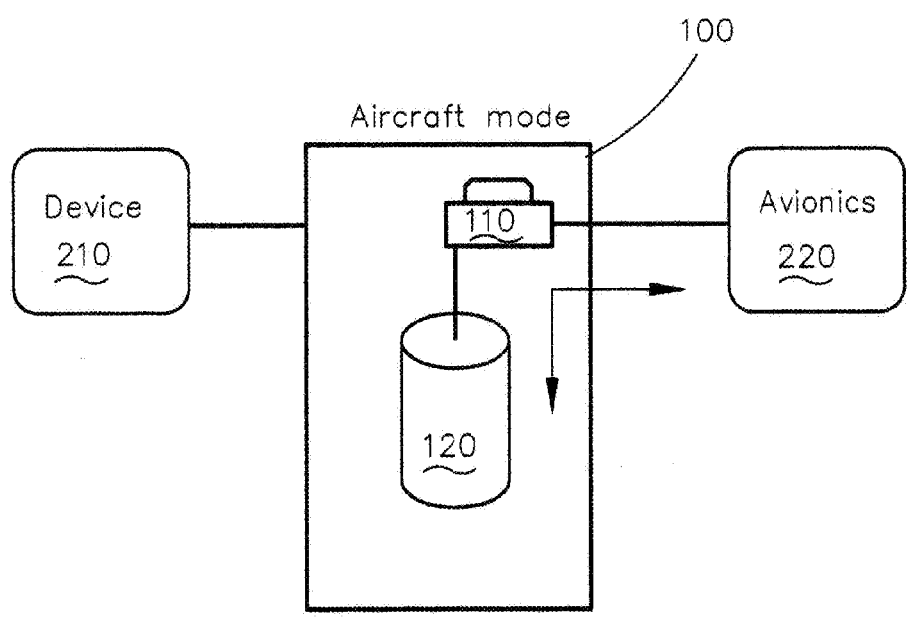
FIG. 2B shows a diagram depicting an aircraft mode of an embodiment of the present invention.

Referring to FIGS. 2A and 2B, an embodiment of the invention is depicted wherein the vault 100 is configured to communicate to one of either the device 210 or the avionics 220 at any given time. The switcher mechanism 110 may be configured to switch the vault from operating in device mode (as shown in FIG. 2A) to operating in avionics mode (as depicted in FIG. 2B), or vice versa.

FIG. 2A depicts the vault 100 in device mode. When the vault 100 is operating in device mode, only the device 210 may transfer data to or from the storage 120 of the vault 100. That is, the device 210 may read data from or write data to the storage 120, but the avionics 220 is disallowed, restricted, or prohibited from reading data from or writing data to the storage 120 in device mode.

On the other hand, FIG. 2B depicts the vault 100 in avionics mode. When the vault 100 is operating in avionics mode, only the avionics 220 may transfer data to or from the storage 120 of the vault 100. That is, the avionics 220 may read data from or write data to the storage 120, but the device 210 is disallowed, restricted, or prohibited from reading data from or writing data to the storage 120 in avionics mode.

The device 210 may include a computing device. The device 210 may also be a mobile computing device (such as a smart phone, a laptop computer, a tablet computing device, or the like). The device 210 may be configured to wirelessly communicate over a wireless connection and/or communicate through a wired or cabled connection (e.g., as referred to in FIGS. 3A and 3B as 311). The device 210 may be configured to send data to and receive data from the vault 100 such that data may be transferred between the storage 120 of the vault 100 and the device 210. The device 210 may be a certified device or a non-certified device, wherein a certified device means that the device has been certified by the FAA. Regardless of whether the device 210 is certified or non-certified, the device 210 may be permitted to transfer data to and from the vault 100.

Figure 3A:
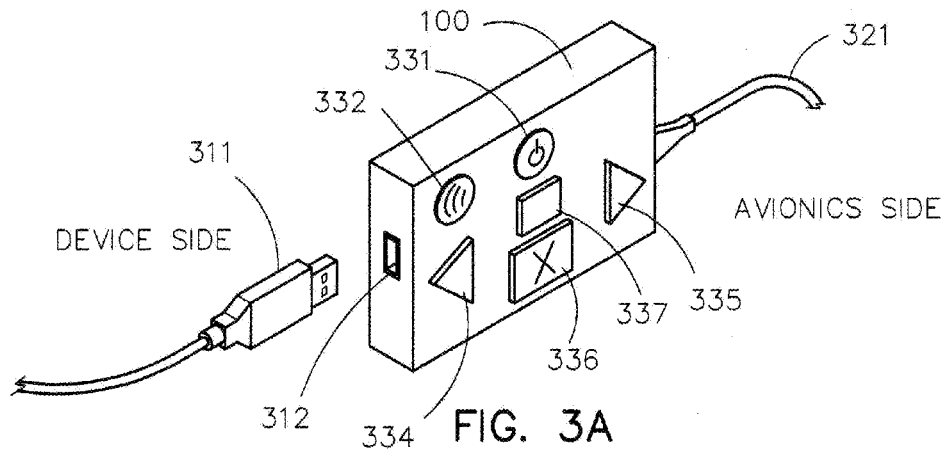
FIG. 3A shows a smart device vault.
Figure 3B:
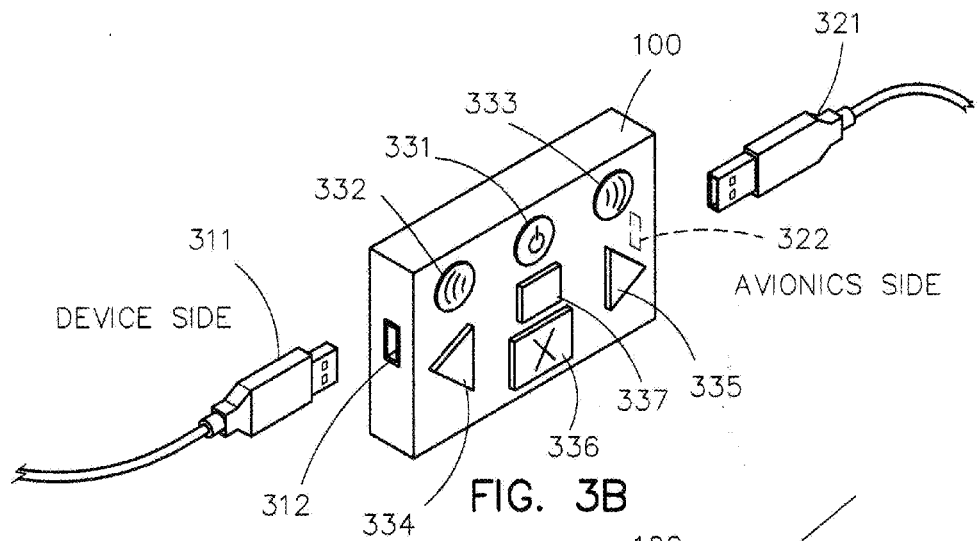
FIG. 3B shows a smart device vault removably connectable to a device side and/or an avionics side.

The device 210 may include a data providing device such as a computing device, a storage device, or the like. The device 210 may also be a mobile computing device (such as a smart phone, a laptop computer, a tablet computing device, or the like). The device 210 may be configured to wirelessly communicate over a wireless connection and/or communicate through a wired or cabled connection (such as a USB cable, an Ethernet cable, or the like) (e.g., as depicted in FIGS. 3A and 3B as 311). The avionics 220 may be configured to send data to and receive data from the vault 100 such that data may be transferred between the storage 120 of the vault 100 and the avionics 220.

Figure 3C:
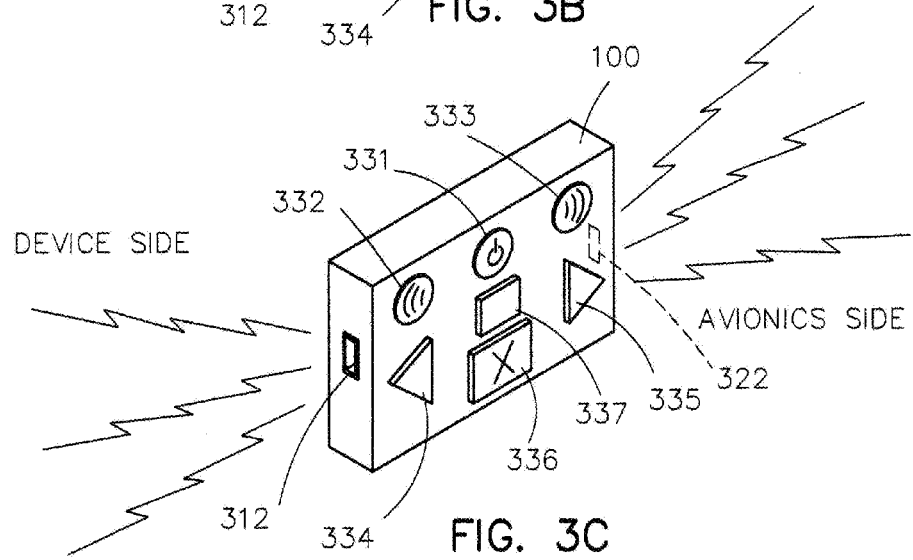
FIG. 3C shows a smart device vault configured to communicate wirelessly to a device side and/or an avionics side.

Referring to FIGS. 3A, 3B, and 3C, implementations of the vault 100 may include buttons 331-337 and various connectivity configurations.

FIG. 3A depicts the vault as an end of a cable 321 configured to connect to the avionics device 220. The vault 100 includes a cable port 312 configured to connect to a cable 311 which may be connected to the device 210.

FIG. 3B depicts the vault 100 as a stand-alone device with cable ports 312, 322 configured to communicatively couple to cables 311, 321 which may be connected to the device 210 and the avionics device 220, respectively.

FIG. 3C depicts the vault 100 as a stand-alone device, whereby the vault is configured for wireless connectivity and cabled connectivity via cable ports 312, 322.

Referring still to FIGS. 3A, 3B, and 3C, some implementations of the vault 100 may include one or more buttons. The vault 100 may include a power button 331 configured to turn the device on, off, in standby, or the like. The vault 100 may include wireless connection buttons 332, 333. The device side wireless connection button 332 may be configured to allow the device 210 to communicate wirelessly with the vault 100. The avionics side wireless connection button 333 may be configured to allow the avionics device 210 to communicate wirelessly with the vault 100. The vault 100 may include cabled connection buttons 334, 335. The device side cabled connection button 334 may be configured to allow the device 210 to communicate via a cable with the vault 100. The avionics side cabled connection button 335 may be configured to allow the avionics device 210 to communicate via a cable with the vault 100. The vault 100 may also include a delete button 336, wherein the delete button is configured to format the storage 120, delete data from the storage 120, purge data from the storage 120, remove data from the storage 120, or the like. The vault may include additional buttons such as button 337, which may configured for performing predetermined or programmable functions; for example, the button 337 may be configured to eject a removable storage device, change the storage location from one storage device of the vault 100 to a different storage device of the vault 100, change a storage volume location, lock the vault 100, unlock the vault 100, or the like.

In some embodiments, the vault 100 may be implemented as a discrete protuberance located on or within the data transfer cable. In other embodiments, the vault 100 may be a stand-alone device configured such that the data transfer cable or cables may be disconnectably connected to the vault 100. In some embodiments, the vault 100 may be configured to communicatively couple to a device 210 and couple to an aircraft, aircraft equipment, or avionics 220 through one or more wireless connections.

The vault 100 may include storage 120. In some implementations, the storage 120 may include two or more storage devices. The storage 120 can comprise at least one computer-readable non-volatile or volatile storage medium. In some embodiments, the storage 120 can comprise removable storage, such as a secure disk (SD) card, a flash drive, or the like. The storage 120 may include a hard-disk drive, a solid-state disk drive, flash memory, random access memory (RAM) (e.g., double data rate (DDR) RAM), or the like. The storage 120 may be connected to the switcher mechanism 110 such that data may be read from the storage 120 and written to the storage 120 from the computing device 210 or the aircraft, aircraft equipment, or avionics 220. The storage 120 may configured to be quickly purged, reset, formatted, deleted, rendered unreadable, encrypted, or the like. For example, the vault 100 may include a setting (such as a default setting, a predetermined setting, a user-defined setting, a user-activated setting, or the like) such that the storage 120 may be configured to quickly delete some or all data from the storage 120 upon occurrence of a condition (such as a data transfer completion condition, delete button activation condition, a time-out condition, an out-of-bounds location condition, or the like) specified by the setting. For example, the storage 120 may automatically delete data from the storage 120 after a predetermined time following a data-transfer, or a user may manually activate the purge of data from the storage 120 by pressing a delete button 336 (as shown in FIGS. 3A-3C).

In some embodiments, the vault 100 can include at least one transmitter/receiver 130. The transmitter/receiver 130 may be configured to wirelessly send and receive data from the device 210 and the avionics 220. The antenna may include a transmitter and/or receiver. The at least one transmitter/receiver 130 can be or can include a Wi-Fi transmitter/receiver, a Bluetooth transmitter/receiver, an RF transmitter/receiver, an NFC (near field communication) transmitter/receiver, or the like.

The vault 100 may include at least one switcher mechanism 110. The at least one switcher mechanism 110 may include or may be implemented as a mechanical device, an electromechanical device, a processor or processing module configured to perform switching functions according to instructions encoded in a non-transitory computer-readable medium, a digital controller configured to execute instructions (such as a programmable logic controller (PLC)), or the like. In some implementations, the electromechanical switch may be communicatively coupled to a controller 140, a processor, or the like.

Implementations of the switcher mechanism as a mechanical device may include the switcher mechanism comprising a mechanical switch device, such as a slidable switch or toggle switch configured to open or close communication circuits. The mechanical switch may have two or more positions. The mechanical switch device may be manually switched from position to position by an operator.

Implementations of the switcher mechanism as an electromechanical device may include the switcher mechanism comprising an electromechanical switch device configured to control which of the device 210 or the avionics device 220 may communicate with the storage 120 at any given time. Embodiments of the switcher mechanism 110 may be configured such that when the switcher mechanism 110 detects that the device is coupled to the vault 100, the electromechanical switch may control which of the device 210 or the avionics device 220 may transfer data with the storage 120 at a particular time. Controlling which of the device 210 or the avionics device 220 may transfer data with the storage at particular time may be predetermined, programmable, user defined, or the like. When both of the device 210 and the avionics device 220 are coupled to the vault 100, the switcher mechanism 110 may have a default setting as to how data transfer is to be controlled. For example, when both the device 210 and the avionics device 220 are coupled to the vault 100, the default setting may be that the device 210 is permitted to transfer data with the storage 120; alternatively, a default setting may be that the avionics device 220 is permitted to transfer data with the storage 120. In further implementations, the default setting for when the device 210 and the avionics device 220 are both coupled to the vault 100 may be that the operator is required to select (for example, by pressing a particular button) which of the device 210 or the avionics device 220 may transfer data with the storage 120. Furthermore, in the circumstance that both of the device 210 and the avionics device 220 are coupled to the vault 100, either through wired or wireless connectivity, an application on the device 210 or the avionics device 220 may be configured to control which of the device 210 or the avionics device 220 may transfer data with the storage 120.

The switcher mechanism 110 may be configured for controlling access to the storage 120 such that no more than of the avionics device 220 or the data providing device 210 can read from or write to the storage at a particular time. For example, as shown in FIG. 2A, in a device mode or device position, a communication circuit connecting the device 210 and the storage 120 of the device may be closed such that the device may transfer data to or from the storage 120, whereas a communication circuit connecting the avionics device 220 and the storage 120 may be open such that the avionics device 220 may not transfer data to or from the storage 120; as shown in FIG. 2B, in an avionics mode or position, the communication circuit connecting the device 210 and the storage 120 of the device may be open such that the device may not transfer data to or from the storage 120, whereas the communication circuit connecting the avionics device 220 and the storage 120 may be closed such that the avionics device 220 may transfer data to or from the storage 120. Additionally, the switcher mechanism 110 may include other modes or positions whereby neither the device 210 nor the avionics device 220 may transfer data to or from the storage 120; for example, the switcher mechanism 110 may include an off mode, a lock mode, a standby mode, a storage purge mode, or the like.

In some embodiments, the switcher mechanism 110 may be configured to automatically unilaterally allow communications between either the avionics 220 and the storage 120 or the device 210 and the storage 120. Automatically unilaterally allowing communications to or from either the device 210 or the avionics 220 may be predetermined, programmable, user-defined, or the like. In some embodiments, the switcher mechanism 110 may include an electronic user interface, such as a button, a touch-screen graphical user interface (GUI), or the like, which electronically triggers the switcher mechanism 110 to permit communications between the device 210 and the storage 120 or the avionics 220 and the storage 120. Additionally, embodiments of the switcher mechanism 110 may be configured such that when the switcher mechanism 110 detects that the device 210 is transferring, attempting to transfer, or requesting to transfer data with the storage 120, the switcher mechanism 110 may prohibit the transfer of data between the storage 120 and the avionics device 220. Likewise, embodiments of the switcher mechanism 110 may be configured such that when the switcher mechanism 110 detects that the avionics device 220 is transferring, attempting to transfer, or requesting to transfer a signal or data with the storage 120, the electromechanical switch may prohibit the transfer of data between the storage 120 and the device 210.

Figure 4:
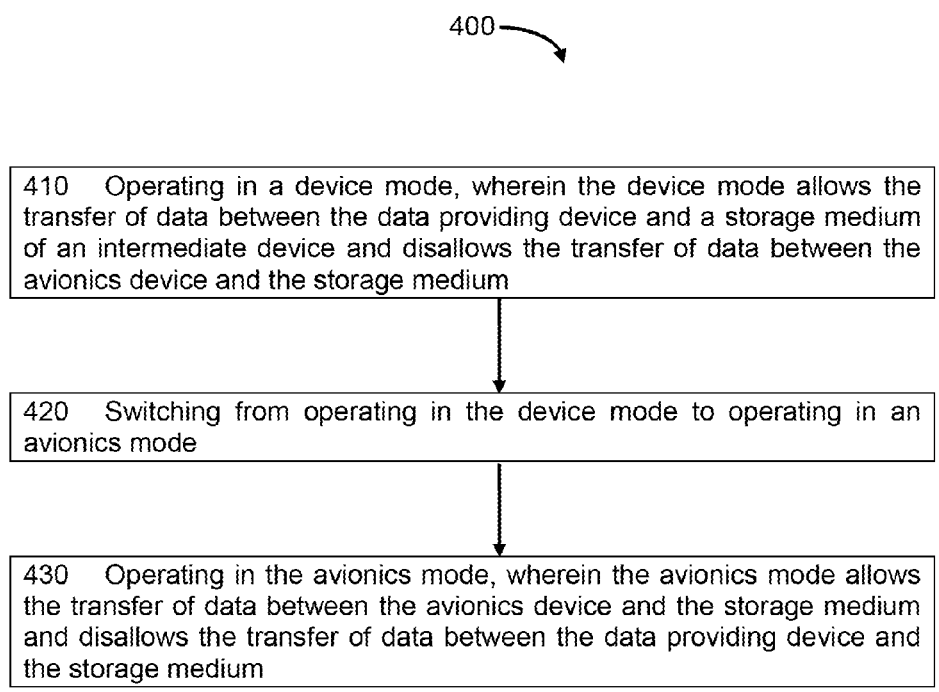
FIG. 4 shows a method for controlling data transfer between a data providing device and an avionics device.

Referring to FIG. 4, an embodied method 400 associated with controlling data transfer between a data providing device 210 and an avionics device 220, is depicted. The data transfer may be via a wireless, cabled, or a partially cabled/partially wireless connection. The method may be performed by the vault 100 or a component of the vault 100. It is contemplated that embodiments of the method 400 may be performed by the switcher mechanism 110, a controller, a processing module, a processor, software, or firmware executed on a computing device, other computing devices, other computer components, or on other hardware, software, firmware, or middleware. The method 400 may include any or all of steps 410, 420, or 430, and it is contemplated that the method 400 may include additional steps as disclosed throughout, but not explicitly set forth in this paragraph. Further, it is fully contemplated that the steps of method 400 may be performed in a non-sequential order.

The method 400 may include the step 410; the step 410 may include operating in a device mode, wherein the device mode allows the transfer of data between the data providing device and a storage medium of an intermediate device and disallows the transfer of data between the avionics device and the storage medium. In some embodiments, the step 410 may further comprise operating in the device mode upon ceasing to operate in the avionics mode.

The method 400 may include also include the step 420, wherein the step 420 may include switching from operating in the device mode to operating in an avionics mode. Similarly, the method 400 may include performing an operating mode change.

Furthermore, the method 400 may include the step 430; the step 430 may include operating in the avionics mode, wherein the avionics mode allows the transfer of data between the avionics device and the storage medium and disallows the transfer of data between the data providing device and the storage medium. In some embodiments, the step 430 may further comprise operating in the avionics mode upon ceasing to operate in the device mode. No more than one of the data providing device or the avionics device is allowed to transfer data to or from the storage medium at a particular time.

Additional steps of method 400 are contemplated, though they are not specifically depicted in FIG. 4.

For example, the method 400 can include determining whether to operate in the device mode or to operate in the avionics mode. More specifically, the method 400 can include determining whether to operate in the device mode or to operate in the avionics mode based upon one or more detected signals from at least one of the data providing device or the avionics device. Additionally, the method 400 may include determining whether a source of data most recently written to the storage medium is the data providing device or the avionics device and determining whether to operate in the device mode or to operate in the avionics mode based upon the source of the data most recently written to the storage medium.

Embodiments of the method 400 can also include recognizing an occurrence of a data transfer condition. Data transfer conditions may include data transfer errors, recognition of a data providing device, a recognition of an avionics device, completion of data written to the storage medium, completion of data being read from the storage medium, data transfer completion, or the like. Some embodiments include executing an action upon recognizing the occurrence of the data transfer condition. In some implementations, the data transfer condition is a data transfer completion condition which occurs upon the completion of a data transfer. For example, the action of purging data form the storage medium may be executed upon a data transfer condition; however, the action may also include locking the storage medium, turning off the vault, resending, retransmitting, or the like.

Some embodiments of the method 400 may further include steps from methods as depicted in FIG. 5 and as described below.

Referring to FIG. 5, an embodied method 500 associated with providing data transfer between a data providing device 210 and an avionics device 220 is depicted. The data transfer may be via a wireless, cabled, or a partially cabled/partially wireless connection. The method may be performed by the vault 100 or a component of the vault 100. It is contemplated that embodiments of the method 500 may be performed by the switcher mechanism 110, a controller, a processing module, a processor, software, or firmware executed on a computing device, other computing devices, other computer components, or on other hardware, software, firmware, or middleware. The method 500 may include any or all of steps 510 or 520, and it is contemplated that the method 500 may include additional steps as disclosed throughout (such as those steps described in reference to FIG. 4 above), but not explicitly set forth in this paragraph. Further, it is fully contemplated that the steps of method 500 may be performed in a non-sequential order.

The method 500 may include the step 510; the step 510 may include switching to a device mode, wherein the device mode allows the transfer of data between the data providing device and the storage medium and disallows the transfer of data between the avionics device and the storage medium.

The method 500 may include the step 520; the step 520 may include switching to an avionics mode, wherein the avionics mode allows the transfer of data between the avionics device and the storage medium and disallows the transfer of data between the data providing device and the storage medium. No more than one of the data providing device or the avionics device is allowed to transfer data to or from the storage medium at a particular time.

That is, performance of the method 500 allows the storage medium to receive the data from the data providing device and to store the data in the device mode, and upon a switch to the avionics mode, the avionics device is configured to read or load the data from the storage medium in the avionics mode without the data providing device ever being directly communicatively coupled to the avionics device.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for controlling data transfer between a data providing device and an avionics device, the method comprising:
   operating in a device mode, by an intermediate device communicatively coupled between the data providing device and the avionics device, wherein the device mode allows the transfer of data to the data providing device from a storage medium of the intermediate device, allows the transfer of data from the data providing device to the storage medium of the intermediate device, disallows the transfer of data to the avionics device from the storage medium, and disallows the transfer of data from the avionics device to the storage medium, wherein the intermediate device has the storage medium and a switcher mechanism; and
   operating in an avionics mode, by the intermediate device, wherein the avionics mode allows the transfer of data to the avionics device from the storage medium, allows the transfer of data from the avionics device to the storage medium, disallows the transfer of data to the data providing device from the storage medium, and disallows the transfer of data from the data providing device to the storage medium,
   wherein only one of the data providing device and the avionics device is allowed to transfer data to or from the storage medium at a particular time while operating in the device mode and the avionics mode,
   wherein the data providing device is only indirectly communicatively coupled to the avionics device through the storage medium of the intermediate device while operating in the device mode and the avionics mode.

2. The method of claim 1, wherein operating in the avionics mode further comprises:
   ceasing to operate in the device mode; and
   operating in the avionics mode upon ceasing to operate in the device mode.

3. The method of claim 1, wherein operating in the device mode further comprises:
   ceasing to operate in the avionics mode; and
   operating in the device mode upon ceasing to operate in the avionics mode.

4. The method of claim 1, further comprising:
   determining whether to operate in the device mode or to operate in the avionics mode.

5. The method of claim 1, further comprising:
   performing an operating mode change.

6. The method of claim 1, further comprising:
   detecting one or more signals from at least one of the data providing device or the avionics device; and
   determining whether to operate in the device mode or to operate in the avionics mode.

7. The method of claim 5, wherein determining whether to operate in the device mode or to operate in the avionics mode further comprises:
   determining whether to operate in the device mode or to operate in the avionics mode based upon the one or more signals from at least one of the data providing device or the avionics device.

8. The method of claim 1, further comprising:
   determining whether a source of data most recently written to the storage medium is the data providing device or the avionics device; and
   determining whether to operate in the device mode or to operate in the avionics mode based upon the source of the data most recently written to the storage medium.

9. The method of claim 1, further comprising:
   recognizing an occurrence of a data transfer condition; and
   executing an action upon recognizing the occurrence of the data transfer condition.

10. The method of claim 1, further comprising:
    recognizing an occurrence of a data transfer completion condition, wherein the data transfer condition is a data transfer completion condition, the data transfer completion condition occurring upon a completion of a data transfer; and
    executing an action upon recognizing the occurrence of the data transfer condition.

11. The method of claim 1, further comprising:
    purging data from the storage medium.

12. The method of claim 1, wherein at least one of the device mode or the avionics mode allows the transfer of data via a wireless connection.

13. An apparatus for providing data transfer between a data providing device and an avionics device, comprising:
    an intermediate device communicatively coupled between a data providing device and an avionics device, the intermediate device including:
       a non-transitory storage medium;
       a switcher mechanism, wherein the switcher mechanism is configured for:
          switching to a device mode, wherein the device mode allows the transfer of data to the data providing device from the non-transitory storage medium of the intermediate device, allows the transfer of data from the data providing device to the non-transitory storage medium of the intermediate device, disallows the transfer of data to the avionics device from the non-transitory storage medium, and disallows the transfer of data from the avionics device to the non-transitory storage medium; and
          switching to an avionics mode, wherein the avionics mode allows the transfer of data to the avionics device from the non-transitory storage medium, allows the transfer of data from the avionics device to the non-transitory storage medium, disallows the transfer of data to the data providing device from the non-transitory storage medium, and disallows the transfer of data from the data providing device to the non-transitory storage medium,
       wherein only one of the data providing device and the avionics device is allowed to transfer data to or from the non-transitory storage medium at a particular time while operating in the device mode and the avionics mode,
       wherein the data providing device is only indirectly communicatively coupled to the avionics device through the non-transitory storage medium of the intermediate device while operating in the device mode and the avionics mode.

14. The apparatus of claim 13, wherein the non-transitory storage medium is configured to receive the data from the data providing device and to store the data in the device mode, and upon a switch to the avionics mode, the avionics device is configured to read the data from the non-transitory storage medium in the avionics mode.

15. The apparatus of claim 13, wherein the switcher mechanism is further configured for:
    determining whether to switch to the device mode or to switch to the avionics mode.

16. The apparatus of claim 13, wherein the switcher mechanism is further configured for:
  detecting one or more signals from at least one of the data providing device or the avionics device; and
  determining whether to switch to the device mode or to switch to the avionics mode based upon the one or more signals from at least one of the data providing device or the avionics device.

17. The apparatus of claim 13, wherein the switcher mechanism is further configured for:
  determining whether a source of data most recently written to the non-transitory storage medium is the data providing device or the avionics device; and
  determining whether to switch to the device mode or to switch to the avionics mode based upon the source of the data most recently written to the non-transitory storage medium.

18. The apparatus of claim 13, wherein at least one of the device mode or the avionics mode allows the transfer of data via a wireless connection.

19. An intermediary device for controlling data transfer between a data providing device and an avionics device, comprising:
  an intermediate device communicatively coupled between a data providing device and an avionics device, the intermediate device including:
    a housing, wherein the housing includes:
      a storage medium;
      at least one user-interface control;
      a first data port, the first data port configured to connect to the data providing device;
      a second data port, the second data port configured to connect to the avionics device; and
      a switcher mechanism, wherein the switcher mechanism is configured to:
        operate in a device mode, wherein the device mode allows the transfer of data to the data providing device from the storage medium of the intermediate device, allows the transfer of data from the data providing device to the storage medium of the intermediate device, disallows the transfer of data to the avionics device from the storage medium, and disallows the transfer of data from the avionics device to the storage medium;
        operate in an avionics mode, wherein the avionics mode allows the transfer of data to the avionics device from the storage medium, allows the transfer of data from the avionics device to the storage medium, disallows the transfer of data to the data providing device from the storage medium, and disallows the transfer of data from the data providing device to the storage medium; and
        allow the transfer of data between the storage medium and only one of the first data port and the second data port at a particular time,
  wherein only one of the data providing device and the avionics device is allowed to transfer data to or from the storage medium at a particular time while operating in the device mode and the avionics mode,
  wherein the data providing device is only indirectly communicatively coupled to the avionics device through the non-transitory storage medium of the intermediate device while operating in the device mode and the avionics mode.

20. The intermediary device of claim 19, wherein the at least one user-interface control includes at least one button.

21. A non-transitory computer-readable medium having computer-executable instructions for performing a method for controlling data transfer between a data providing device and an avionics device, the computer-executable instructions configured to execute:
  switching to a device mode, wherein the device mode allows the transfer of data to the data providing device from a non-transitory storage medium of an intermediate device, allows the transfer of data from the data providing device to the non-transitory storage medium of the intermediate device, disallows the transfer of data to the avionics device from the non-transitory storage medium, and disallows the transfer of data from the avionics device to the non-transitory storage medium; and
  switching to an avionics mode, wherein the avionics mode allows the transfer of data to the avionics device from the non-transitory storage medium, allows the transfer of data from the avionics device to the non-transitory storage medium, disallows the transfer of data to the data providing device from the non-transitory storage medium, and disallows the transfer of data from the data providing device to the non-transitory storage medium,
  wherein the instructions are stored on the intermediate device, the intermediate device communicatively coupled between the data providing device and the avionics device, the intermediate device having the non-transitory storage medium and a switcher device,
  wherein only one of the data providing device and the avionics device is allowed to transfer data to or from the non-transitory storage medium at a particular time while operating in the device mode and the avionics mode,
  wherein the data providing device is only indirectly communicatively coupled to the avionics device through the non-transitory storage medium of the intermediate device while operating in the device mode and the avionics mode.

* * * * *